United States Patent Office 2,876,561
Patented Mar. 10, 1959

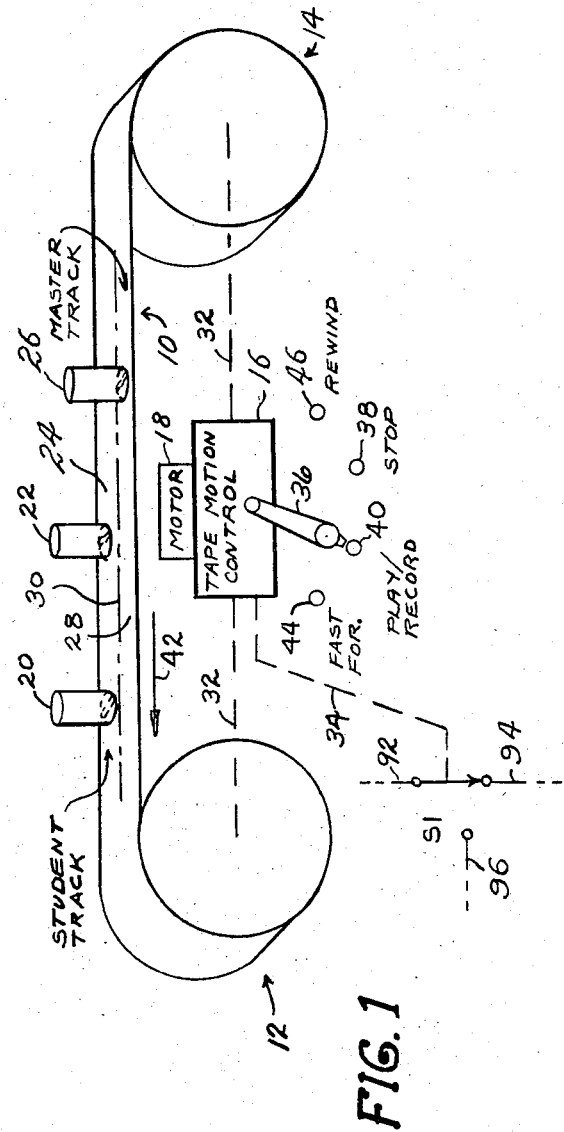

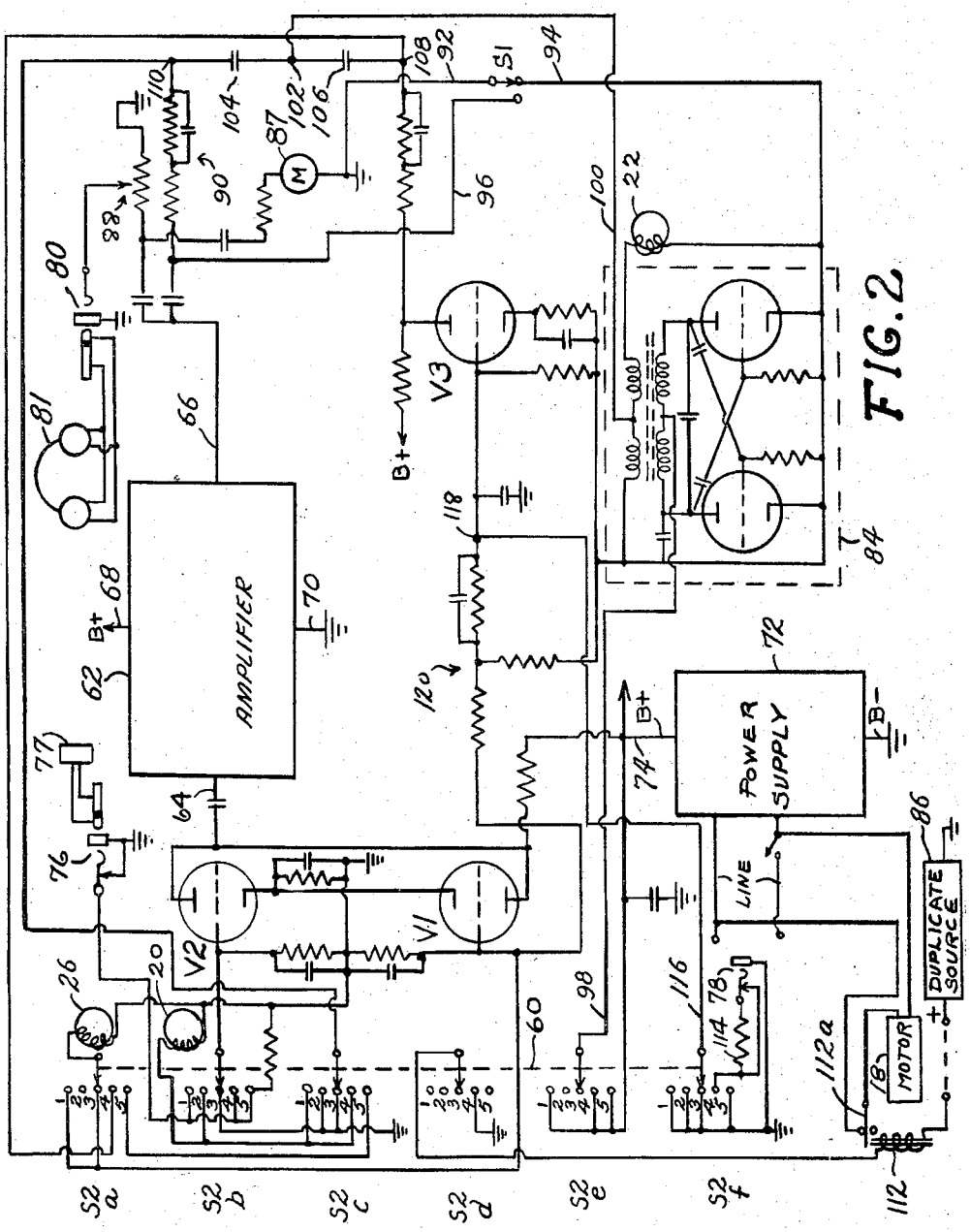

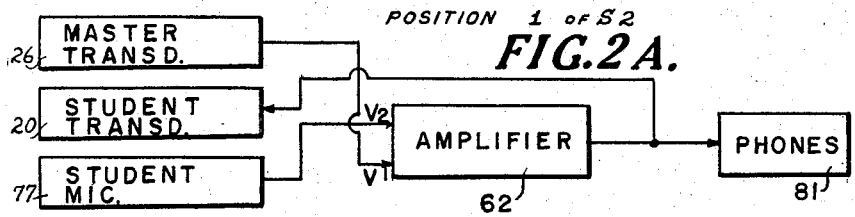
FIG. 2A.
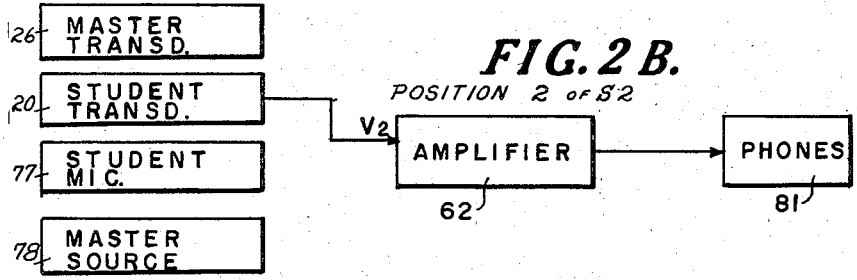
FIG. 2B.
FIG. 2C.
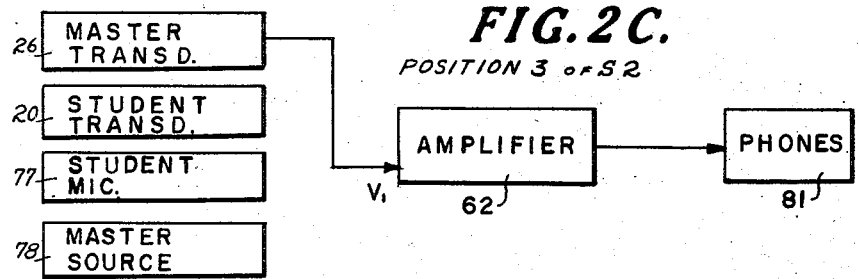
FIG. 2D.
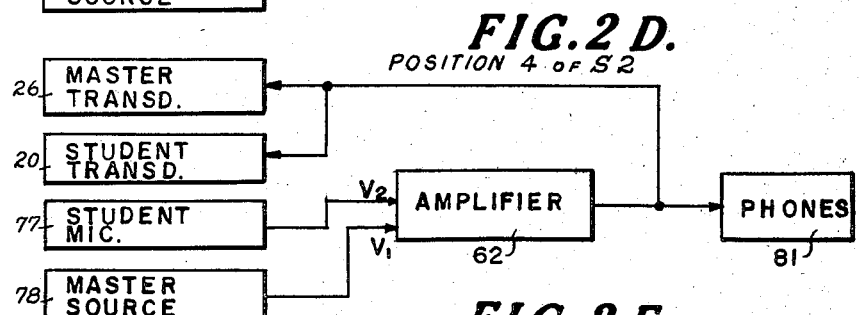
FIG. 2E.
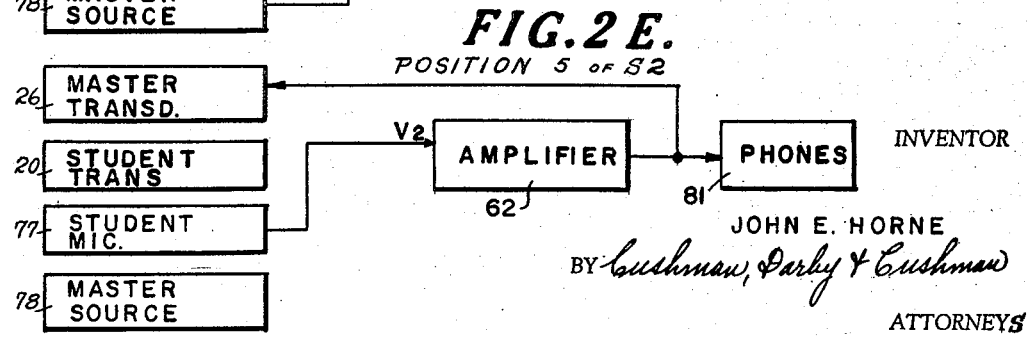

2,876,561

RECORDING AND REPRODUCING APPARATUS FOR TEACHING LANGUAGES

John E. Horne, Hyattsville, Md., assignor to Electronic Teaching Laboratories, Washington, D. C., a corporation of the District of Columbia Application September 6, 1957, Serial No. 682,526

5 Claims. (Cl. 35—35)

This invention pertains to the arts of teaching and learning and to the use therein of mechanical and electrical aids.

Particularly since the advent of the so-called magnetic tape recorder considerable effort has been made to use such equipment to speed and otherwise aid the arts of learning and teaching. Heretofore some types of these aids have been utilized, with some success. However, in accordance with the present invention pronounced progress is made in this field.

While the principles of the present invention may be employed to teach or to learn any type of subject matter, such are primarily useful in the teaching of languages and the present application will proceed with reference thereto, but without any necessary limitation. Nor is magnetic recording necessary, although it is preferred to other types of recording.

It has been discovered that to meet all practical demands of the student and also of whatever educational institution is involved, a record should be made having in one portion thereof a record of the instructor's voice, it being contemplated that the student will listen to the instructor's voice and then himself speak either concurrently with, or subsequent to intervals of, the instructor's voice. The student may speak in a translation of a language employed by the instructor, or the student may repeat in the same language as the instructor or some closely allied version thereof which would not be strictly accepted as a translation.

A particular feature of the present invention is the providing of the instructor's voice in one portion of the record, with the arrangement such that the instructor's voice cannot be tampered with. The equipment is to detect the instructor's voice, play it directly into earphones or the like for the benefit of the student, and also to re-record the instructor's voice in a separate part of the record. If and when the student speaks in response to the instructor's voice, his speech will be recorded only in the second or student portion of the record and there will be no effect upon or possible alteration of the first mentioned or master portion of the record. Erasure is to be possible only in the student portion of the record and not in the master portion, this to absolutely preserve the integrity of the master portion, which may have considerable value.

The equipment is to have considerable flexibility in accordance with principles of the present invention, to permit not only the aforementioned operations but also to permit one piece of equipment to be usable to concurrently prepare master records for other pieces of equipment and concurrently permit a class exercise to progress.

Accordingly, the primary object of this invention is to provide the new methods and equipment for improved techniques of teaching and learning.

Further objects and the entire scope of the invention will become further apparent from the following detailed description of an illustrative embodiment of the invention and from the appended claims.

Illustrative embodiments may be best understood with reference to the accompanying drawings, wherein:

Figure 1 diagrammatically shows mechanical features of the invention, and

Figure 2 diagrammatically shows electrical and electronic features of the invention.

Figure 2A diagrammatically illustrates the predominant interconnection of components in position 1 of switch S2.

Figure 2B diagrammatically illustrates the predominant interconnection of components in position 2 of switch S2.

Figure 2C diagrammatically illustrates the predominant interconnection of components in position 3 of switch S2.

Figure 2D diagrammatically illustrates the predominant interconnection of components in position 4 of switch S2.

Figure 2E diagrammatically illustrates the predominant interconnection of components in position 5 of switch S2.

Now referring to Figures 1 and 2 an exemplary equipment will be described. Generally stated it can be said that the equipment comprises an essentially mechanical portion diagrammed in Figure 1 and an essentially electrical or electronic portion diagrammed in Figure 2. Like components are given identical reference character designations in the respective figures. A general description of this equipment will now be given, followed by operational analysis.

Referring to Figure 1, a record member in the form of a magnetizable tape 10 is shown operating between two reels 12 and 14, the latter under the control of a tape motion control mechanism 16. The latter will incorporate a motor 18. A student recording and playback transducer 20 and an erase transducer 22 are positioned by suitable supporting structure (not shown) so as to each sweep out one and the same student track 24 on the tape 10. A master recording and playback transducer 26 is suitably supported to sweep out a master track 28 on the tape. Chain line 30 in Figure 1 is intended to point out the imaginary demarcation line between the tracks 24 and 28. Dual track tape recording mechanisms are well known in the art for other purposes, and no further explanation thereof is thought to be required. Dash lines 32 are to represent the mechanical drives to the reels 12 and 14 from the tape motion control unit 16. Dash line 34 designates a mechanical operator for a switch S1, the function of which will be explained in detail hereinbelow. The tape motion control unit 16 is characterized by an operating lever 36 which may be moved into several positions: The first is position 38 for stopping tape motion. The next position is 40 for moving the tape forward (the direction of arrow 42 for either recording or playback). Additionally, there is a fast forward position 44 and still further a fast reverse or rewind position 46 for the usual purposes.

Referring to Figure 2 the general arrangement of electrical components is as follows: A multiple gang-multiple position switch S2 is provided. This switch is diagrammed at the left-hand end of Figure 2 and consists of gangs *a* through *f* inclusive. Dash line 60 designates the mechanical linkage of S2 which is available for manual operation by the operator of the equipment.

Also shown in Figure 2 is the student transducer 20, the erase transducer 22 and the master or instructor's transducer 26. Switch S1 of Figure 1 is also shown in Figure 2 at the right-hand end. Motor 18 is in Figure 2 at the lower left-hand corner.

The equipment of Figure 2 is further characterized by an amplifier circuit 62, this having an input line 64, an output line 66 and connection to B+ on line 68. Grounded line 70 also serves the amplifier circuit. The amplifier is not described in detail inasmuch as it may be any conventional amplification circuit adapted for magnetic recording purposes. The details of such amplifiers are well known in the art and no further description is believed necessary herein.

The circuit of Figure 2 further includes any conventional circuit 72 for supplying B+ on line 74 in whatever values may be desired in view of the remaining circuitry. There will be a connection (not shown) between circuit 72 and line 68 for supplying B+ to the amplifier and to other points in Figure 2 whereat the legend B+ occurs. B— is returned to ground.

The input to amplifier circuit 62 is connected jointly to the circuit of tube V1 and the circuit of tube V2 which tube circuits are controlled as will be hereinafter explained.

A jack 76 is provided for receiving the plug of a microphone 77 to be used by the student in conjunction with the equipment. A further jack 78 is provided for supplying signals to the equipment for purposes of duplicating master track recordings. Output jack 80 is provided for plugging thereinto headphones 81 and/or connecting the output of the particular equipment into other equipments for making use of the signals generated in the equipment under discussion.

The equipment of Figure 2 is further characterized by an oscillator circuit for producing supersonic bias oscillations as is conventional in the magnetic recording art, this oscillator being within dash line 84. There is also provided a source 86 of duplicator control voltage. As will be explained hereinafter, when connected into a circuit between a common system ground and a plurality of equipments such as shown in Figures 1 and 2, control is exercised over the motors 18 of the respective equipments to cause same to start and stop in synchronism, this being important in a master or instructor duplicating process to be explained. The circuit is otherwise characterized by the circuit of tube V3 which is employed in conjunction with an operation of the equipment described below.

A rectifying bridge and meter 87 are connected to the output of amplifier 62 to provide an indication of power level.

Now considering the operation of the equipment, it will be noted that the switch S2 has five positions, these being lettered accordingly at each gang a–f. In position 1 of switch S2 the equipment is conditioned for listening or recording. Position 2 is for playback; position 3 is for playing the master record only; position 4 is for duplicating master records on a plurality of machines and at the same time permitting an instructional program to progress, and position 5 is for recording only on the master record by use of the student microphone 77 plugged at jack 76. Figures 2A–2E inclusive show the predominant circuit connection for positions 1–5, respectively, of switch S2.

For an analysis of operation let it first be assumed that a tape 10 has been prepared by recording an instructor's voice in the master track 28. This may be a plurality of phrases in a given language spoken by an instructor, with pauses therebetween. During the pauses the student is expected to speak either a translation of the instructor's phrases or in the same language. As elsewhere mentioned herein, there is no limitation to teaching languages, however, and the instructional material may be of any nature. In any event, the tape thusly recorded in the master track is inserted into the equipment. The operator (student) plugs his microphone into jack 76 and a set of headphones into jack 80. Switch S2 is set to its 1 position. Finally, the student moves the tape motion control lever 36 (Fig. 1) from the stop position 38 to the play record position 40.

As tape motion now progresses due to operation of motor 18 and the tape motion control mechanism 16 generally, signals generated in the master transducer 26 are applied through S2(a) to the grid of V1. After amplification in circuit 62 the signals are heard by the student through his headset plugged at jack 80. The volume may be controlled by use of potentiometer 88.

After the student has listened to a phrase of the instructor's voice he may then speak into his microphone plugged into jack 76. Signals generated in the microphone are connected through position 1 of S2(b) to the grid of tube V2 and after amplification at this point these signals are further amplified in amplifier circuit 62 and are available and heard by the student through his headset plugged into jack 80. Simultaneously the student's voice as available on the output line 66 of amplifier 62 is coupled through resistor capacitor network 90 and through position 1 of S2(c) to the student transducer 20 whereby the student's voice is recorded in the student track 24 (Fig. 1).

While the foregoing is in progress the fact that the control lever 36 is at the play record position 40 further causes operation of mechanical linkage 34 (Fig. 1) so as to find switch S1 set to connect grounded conductor 92 to conductor 94 which supplies ground to the supersonic bias oscillator circuit 84. Ground is broken between 92 and 94 at S1 whenever the lever 36 is in any of its other positions. When in said other positions ground is connected through S1 from line 92 to line 96 which grounds the output of amplifier 62 insofar as the output thereof is partially available through the resistance capacitor network 90 as heretofore explained. This precludes the possibility of signals passing beyond network 90 to undesirably modify the magnetic state of the record tracks 24 and 28 while operating in other than the play record position 40.

Still continuing with lever 36 in the play record position 40 and S2 in its 1 position, B+ on line 74 is supplied through S2(e) over line 98 to supply B+ to the supersonic bias oscillator 84. One output of the oscillator, on line 100, is supplied to junction 102 from which it is coupled through a capacitor 104 to the output of previously mentioned resistor capacitor network 90 and is otherwise coupled through a capacitor 106 to a terminal 108 for purposes hereinafter explained. Additionally, erase transducer 22 is only energized by oscillator 84, and when the latter is not operative there can be no erasure of the student track. Conversely, whenever oscillator 84 is energized the student track will be erased.

As a consequence of the foregoing operation it will be apparent that the student has recorded his responses to the instructor's voice from the master record. These responses are recorded solely upon the student track or record and there has been no possibility of affecting in any way the valuable instructor's voice on the master track. Furthermore, in addition to the student's voice recorded on the student track, a reproduction or re-recording of the instructor's voice appears on the student track. This is a particularly important aspect of the present invention.

The student may now play back the recording of the instructor's voice and also his own voice from the student track. This is accomplished by setting switch S2 to its number 2 position and setting the tape motion control operated lever to the play record position 40 (intervening rewind of the tape is assumed).

It is first noteworty that with switch S2 in its number 2 position, the master transducer 26 is completely disconnected at S2(a). Noting that there is no erase transducer in the master track 28, any inadvertent erasure or modification in the master track is precluded. S2(e) in its number 2 position precludes the application of B+ to the supersonic bias oscillator circuit 84 and thus there is no chance for a signal therefrom to influence the student track. Failure of B+ on line 98 also deactivates erase transducer 22 in the student track. The student's microphone is disconnected at position 2 of S2(b), which instead connects the student transducer 20 to the input of V2. As a net result the student only hears the recordings on the student track through his headphones plugged at jack 80.

The next variety of operation is position 3 of switch S2, for playing the master track only. Tape motion control operator 36 is again at play record position 40. With S2 in its number 3 position the master transducer 26 is connected via S2(a) to the grid of V1 and signals from the master track are thusly available through jack 80. However, signals at terminal 110 beyond the resistance capacitor network 90 are grounded via S2(c). The oscillator 84 is inoperative due to disconnection of B+ at S2(e). Any signals generated in the student's microphone and incoming via jack 76 are of no effect. Any signals generated in the student's transducer 20 are of no effect. The grid of V2 is grounded via S2(b).

Position 4 of switch S2 provides for a concurrent duplication of master records and also permits the progress of an instructional program to go forward. The following points should be considered: It is contemplated that a plurality of equipments according to the present invention will be simultaneously in operation by an equal number of student operators. The instructor in charge of the class may wish to change the instructional material on the master tracks 28 of each of the plurality of student equipments. However, the time schedule may be such as to preclude or render very inconvenient the concept of taking the time to first make a new recording on the master tracks and then proceeding with classroom work. According to an important aspect of the present invention these objectives can be accomplished simultaneously.

Let it be assumed that the instructor has available a desired master tape for producing a source of master signals, or the instructor is prepared to speak into a microphone the phrases he desires for the purpose of creating a master recording. Whatever the source of new master signals may be, it is plugged into jack 78. The instructor also connects source 86 to each of the plurality of equipments being used by the students. This operation has the effect of energizing a relay coil 112 in each of the student equipments and in each equipment a relay arm 112a is operated to open the circuit to motor 18. Thus all of the equipments are precluded from operation until the instructor is ready to proceed. Remarks hereinafter will be confined to the effect upon one equipment, with the understanding that others are operated in like fashion.

There is now inserted into each student equipment a fresh tape which is blank or erased in the master track. Recalling that switch S2 is in its number 4 position, at S2(f) the signals generated by the instructor for new master track recordings incoming through jack 78 pass through coupling resistor 114 and then over line 116 to junction 118. From junction 118 the signals pass in a first direction through resistance capacitance circuits designated generally 120 for attenuation and other purposes to the grid of V1 and then through amplifier circuit 62 to jack 80. Additionally, the same signals from amplifier 62 pass via junction 110 and S2(c) to transducer 20 to cause recording in the student track. Simultaneously, source signals available at jack 78 and from junction 118 are applied to the grid of V3 and amplified signals from the plate thereof are available from junction 108 through S2(a) to the master transducer 26. The tape motion control lever 36 during this operation is at the play record position 40 and as a consequence S1 connects the oscillator 84 to ground. Additionally, the oscillator circuit 84 is supplied with B+ through S2(e). As above noted the instructor has connected source 86 to all of the equipments and with S2(d) in its number 4 position a return to ground is created (there will be a common ground system among all the equipments and the source 86). Therefore, all of the motors 18 will be started simultaneously when source 86 is disconnected. This permits the instructor to have control over the operation of all of the equipments.

Still continuing with operation number 4, while the creation of new master recordings is progressing each student may participate in classroom work just as in the first operation, inasmuch as S2(b) at position 4 connects the student's microphone (jack 76) to the grid of V2. As a net result of the operation in position 4 of switch S2, regular classroom work has progressed and at the same time the instructor has been able to create a new master recording at each equipment. It is to be understood, however, that during the creation of a new master record as just described, the student is not at liberty to stop or reverse the motion of the record member.

The circuit of V3 is grounded only through S1, which precludes undesired operation of V3 when lever 36 is at other than position 40.

In position 5 of switch S2 provision is made for use of the microphone or other signal source plugged at jack 76 to record only upon the master track. For this use the tape motion control lever 36 is at play record position 40, which grounds oscillator 84 via switch S1. B+ is concurrently supplied to the oscillator via S2(e). Signals from jack 76 are now applied to the grid of V2 and signals from the output of amplifier 62 at junction 110 are applied through S2(c) and then through S2(a) to the master transducer 26. Supersonic bias oscillations are supplied from the oscillator over line 100 through junction 102 and coupled through capacitor 104 to junction 110 and then to the master transducer as just traced to supply the desired bias oscillations for the recording.

A particularly important feature of the invention is the arrangement whereby a single amplification channel (62) serves to permit improved teaching and learning methods, whereas prior practices have required dual amplification channels for inferior methods. This is an important point because the amplification channel is an expensive component both as to initial cost and servicing.

Another important feature of the invention is that the herein process of recording from the master track onto the student track and also recording the student's responses only on the student track, with erasure possible only on the student track, permits simple re-playing of a portion of the record without damage to the master recording. In more detail, assume a student is listening to the instructor's voice recorded on the master track and is in the process of recording translations or other material in response to the instructor. However, he suddenly comes upon something that he challenges or questions, and wishes to again consider. With the present equipment the student simply moves the lever 36 to and through the stop position 38 (Fig. 1) and to the rewind position 46 sufficiently long for the record to be rewound the required distance. Then, the student need simply move the lever 36 through the stop position 38 to the play record position 40. He will now again hear the instructor's voice in repetition and can again consider the questioned material. The point emphasized here is that the student has only a single and very simple operation to perform, to wit, grasping the lever 36, moving it to the rewind position and then moving it back to the play record position 40. In typical prior art equipments it has been necessary for a student to perform a great number of operations to perform the same feat. In some equipments in use it has been necessary for the student to perform as many as nine separate control operations, including such things as getting the mechanism back into a play record position and having to manipulate various other controls which serve as safety devices for ordinarily preventing undesired erasure or recording in various tracks. According to the present invention the main process of re-recording the master track in the student track along with the various automatically operating safety features such as the switch S1 and its interconnection with the tape motion control as heretofore explained, eliminates all of the complexity which has heretofore confused students. Now, by the present invention the student need only manipulate a single control member to rewind a length of record and repeat that portion of the lesson. There is no requirement for the student to remember a great many complex manipulations of controls for performing the function.

From the foregoing it will be apparent that novel methods and equipment are provided for efficient and versatile teaching or learning of languages or other material. It is to be understood that the foregoing detailed description of an illustrative embodiment of the invention has been given only for purposes of providing a clear description and the scope of the invention is to be determined from the appended claims.

What is claimed is:

1. Educational apparatus comprising a plurality of units of equipment each to be manned by a student and each unit including means for recording in a master record track and means for recording in a separate student record track, a source of instructional signals, means connecting said source with each unit for recording said signals in both of said tracks of each unit, means for making said instructional signals audible to each student, means for generating signals representing the response of each student to the instructional signals, and means interconnecting each student signal source with the student track recording means of his unit, the arrangement being such that a master track recording of the instructional signals may be made on all of said units concurrently with the student track recording of said instructional signals and student response.

2. Educational apparatus comprising recording medium, first transducer means for reproducing signals from a master track of the recording medium, second transducer means for recording and reproducing signals in a student track of the recording medium separate from the master track, means for moving the recording medium relative to said transducer means, the moving means including means for causing said relative motion in a first recording and reproducing direction and further including means for causing said motion in a rewind direction, the apparatus further including means for generating sound based on signals reproduced from the master track, means for recording said signals from the master track in the student track, means for generating signals representing student response to said signals reproduced from said master track, and means for recording said student signals in said student track along with said signals from the master track, the apparatus further including means for preventing application of signals to the first transducing means during either the aforesaid reproducing motion of the record or rewind motion of the record, the arrangement being such that by simple manipulation of the moving means from the reproducing and recording motion condition to the rewind motion condition and return permits repetition of the reproduction from the master track but precludes all possibility of modification of the signals recorded in the master track.

3. Apparatus as in claim 2 wherein the apparatus includes amplification means for amplifying the signals from the first transducer during the reproducing motion setting of the moving means, and further includes means interconnecting the amplification means and the moving means for grounding the output of the amplifier during the rewind motion operation.

4. In educational recording and reproducing apparatus, first transducing means, second transducing means, means for moving recording medium relative to each of the transducing means so that the respective transducing means sweep out first and second separate record paths, single amplification means having input means and output means, means for interconnecting the first transducing means with the input means of the amplification means, means responsive to voice vibrations created by a student operator for generating signals based thereon, means for concurrently supplying the last mentioned signals to the amplification input means, means for connecting the amplification output means to the second transducing means, means to also connect the amplification output means to means for rendering the signals therefrom audible to the operator, the arrangement being such that with instructional signals recorded in the first record path swept by the first transducing means signals generated therefrom in the first transducing means will pass through the amplification means to the means for rendering audible and the signals based upon the operator's voice will pass through the same amplification means and will be recorded in the second record path swept by the second transducing means.

5. Apparatus as in claim 4 and further including means for disconnecting said first transducing means from the amplification input means for repeated playback of the signals recorded in the second path swept by the second transducing means without the possibility of erasure or modification of the signals recorded in the first record path.

References Cited in the file of this patent

UNITED STATES PATENTS

| | | |
|---|---|---|
| 2,082,261 | Runyan | June 1, 1937 |
| 2,209,157 | Glunt | July 23, 1940 |
| 2,416,353 | Shipman et al. | Feb. 25, 1947 |
| 2,558,853 | Kappeler | July 3, 1951 |
| 2,777,901 | Dostert | Jan. 15, 1957 |
| 2,797,264 | Blaney | June 25, 1957 |

FOREIGN PATENTS

| | | |
|---|---|---|
| 766,434 | Great Britain | Jan. 23, 1957 |